United States Patent [19]

Favre

[11] Patent Number: 5,030,059
[45] Date of Patent: Jul. 9, 1991

[54] INSTALLATION FOR RAPIDLY LIFTING AND STACKING SHEETS OF GLASS

[75] Inventor: Serge Favre, Tartas, France

[73] Assignee: Societe Generale pour les Techniques Nouvelles S.G.N., France

[21] Appl. No.: 406,451

[22] Filed: Sep. 13, 1989

[30] Foreign Application Priority Data

Sep. 15, 1988 [FR] France .................. 88 12053

[51] Int. Cl.⁵ .............................. B65G 57/00
[52] U.S. Cl. .................. 414/798.5; 414/798.9; 414/737; 414/783
[58] Field of Search ............ 414/793, 793.1, 798.2, 414/794.5, 798.9, 737, 787; 60/414

[56] References Cited

U.S. PATENT DOCUMENTS

| | | | |
|---|---|---|---|
| 3,541,597 | 11/1970 | Segawa et al. | 414/798.5 |
| 3,905,496 | 9/1975 | Reeder | 60/414 X |
| 3,934,871 | 1/1976 | Dean | 414/798.5 |
| 4,093,083 | 6/1978 | Klaus | 414/798.5 |
| 4,665,696 | 5/1987 | Rosman | 60/414 |
| 4,846,625 | 7/1989 | Gabillet | 414/798.5 X |
| 4,863,340 | 9/1989 | Masunaga et al. | 414/798.5 X |

FOREIGN PATENT DOCUMENTS 2160765 6/1973 Fed. Rep. of Germany.

Primary Examiner—Robert J. Spar
Assistant Examiner—Craig Slavin
Attorney, Agent, or Firm—Louis Weinstein

[57] ABSTRACT

An installation for lifting and stacking or unstacking sheets of glass and particularly sheets of small dimension (i.e. one meter by 1.5 meters). The installation has a secondary conveyor (1), an elevator and a panel (24). The elevator has at least one arm (5) provided with suction cups (7) mounted on the sliding support. The arm is driven in rotation through an angle of about 90 degrees by a connecting rod-crank system (13) provided with at least one balancing jack (18) as well as a jack for laterally displacing the elevator and the secondary conveyor. The installation makes it possible to obtain very rapid operating rates (of the order of two seconds) at a reduced power output.

4 Claims, 6 Drawing Sheets

1

INSTALLATION FOR RAPIDLY LIFTING AND STACKING SHEETS OF GLASS

BACKGROUND OF THE INVENTION

The invention relates to an installation for lifting sheets of glass, this operation consisting in guiding a sheet gripped in a substantially horizontal position to a substantially vertical position, where it is deposited, this in order to form stacks (stacking), or in guiding a sheet gripped in a substantially vertical position on a stack to a substantially horizontal position on a conveyor (unstacking).

In production units, the glass is obtained in the form of a web (by the "float glass" process, for example) which is then cut out into sheets.

The web and the sheets are conveyed by one (or more) horizontal principal conveyor(s).

These sheets are then lifted to a so-called gripping station in order to be stacked on handling trucks provided with panels (comprising a substantially horizontal plane and a substantially vertical plane) on which they come into abutment.

The glass web being directly cut out on the principal conveyor in the longitudinal direction (direction of the axis of the conveyor) and the transverse direction (direction perpendicular to the longitudinal direction in the plane of the conveyor), the delivery of objects increases and the lifting machines must operate (i.e. handle each sheet) at rapid rates (2 to 4 secs.) or very rapid rates (of the order of 2 secs.).

French Patent FR 86 05656 published under No. 2 597 453 describes a compact rapid elevator (lifting machine), in which rates of 2 to 4 secs. are obtained by multiplication of the number of gripping arms. In this way, in this elevator according to the prior art, there are two retractable gripping arms provided at each of their ends with gripping means (suction cups), which makes a total of four gripping points of which two are simultaneously active (one per arm).

BRIEF DESCRIPTION OF THE INVENTION

The present invention proposes an installation with an elevator which is more rapid and of different conception.

More precisely, the installation comprises for stacking:

a secondary conveyor placed in line with the principal conveyor and on which the sheets are gripped at a gripping station, at the end of and below said secondary conveyor, an elevator comprising:

at least one arm comprising a support on which are fixed suction cups connected to a vacuum-producing means and disposed so as to pass between the rollers of the secondary conveyor to grip the sheet, a connecting rod-crank system actuated by at least one motive jack acting on said arm(s) in order to obtain rotation thereof through an angle of about 90° about a horizontal axis perpendicular to the axis of the conveyor so as to bring the sheets to the depositing station, a panel constituting the deposit station displaceable along the axis of the conveyor, means for automatically controlling, in particular the speeds of conveying, the halt of the sheets, the movements of the arm(s) and of the panel, said installation comprising the following further characteristics:

at least one hydraulic balancing jack connected to said connecting rod-crank system and also connected to a nitrogen accumulator so as to dampen the movements of the arm(s) and to reduce the power required for operation, means for displacing the arm(s) and/or the support bearing the suction cups along the longitudinal axis of said arm(s), for gripping and depositing the sheets, means for laterally displacing the secondary conveyor and the elevator.

The installation comprises for unstacking:

a secondary conveyor placed in line with the principal conveyor and on which the sheets are deposited at a deposit station, at the end of and below said secondary conveyor, an elevator comprising:

at least one arm comprising a support on which are fixed suction cups connected to a vacuum-producing means and disposed so as to pass between the rollers of the secondary conveyor to deposit the sheet, a connecting rod-crank system actuated by at least one motive jack acting on said arm(s) in order to obtain rotation thereof through an angle of about 90° about a horizontal axis perpendicular to the axis of the conveyor so as to bring the sheets to the depositing station, a panel constituting the gripping station displaceable along the axis of the conveyor, means for automatically controlling, in particular the speeds of conveying, the halt of the sheets, the movements of the arm(s) and of the panel, said installation comprising the following further characteristics:

at least one hydraulic balancing jack connected to said connecting rod-crank system and also connected to a nitrogen accumulator so as to dampen the movements of the arm(s) and to reduce the power required for operation, means for displacing the arm(s) and/or the support bearing the suction cups along the longitudinal axis of said arm(s), for gripping and depositing the sheets, means for laterally displacing the secondary conveyor and the elevator.

According to another characteristic of the invention, the displacement on the motive jack is controlled so that the rotation of the arm obeys the law:

$$\alpha = A\left(\frac{t}{t_0}\right)^5 + B\left(\frac{t}{t_0}\right)^4 + C\left(\frac{t}{t_0}\right)^3$$

with
$\alpha$ = angle of rotation of the arms
$A, B, C$ = numerical constants

BRIEF DESCRIPTION OF THE FIGURES

The description will be more readily followed from the Figures:

FIGS. 5 and 6 show the nitrogen accumulator employed in the installation of FIG. 1.

DETAILED DESCRIPTION OF THE INVENTION

The glass sheets advance on a conveying line. To be lifted, they are deviated on one or more "spikes" which are conveyors disposed perpendicularly to the principal conveying line, they are then lifted by lifting machines located at the spike end. "Principal conveyor" will designate the conveyor conveying the sheets to take them to the lifting installation.

This installation according to the invention comprises a secondary conveyor of reduced length (of the order of 1 to 2 m for example) which is placed in line with the principal conveyor.

Figure 1:
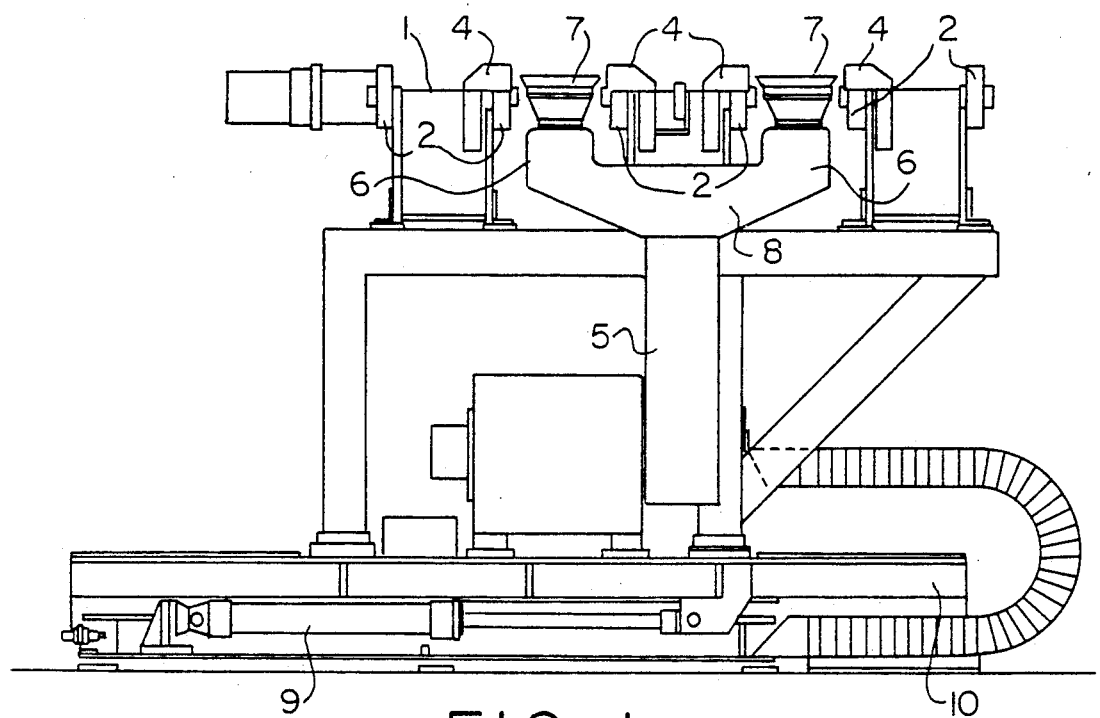
FIG. 1 shows a view of the installation in the axis of the secondary conveyor.
Figure 2A:
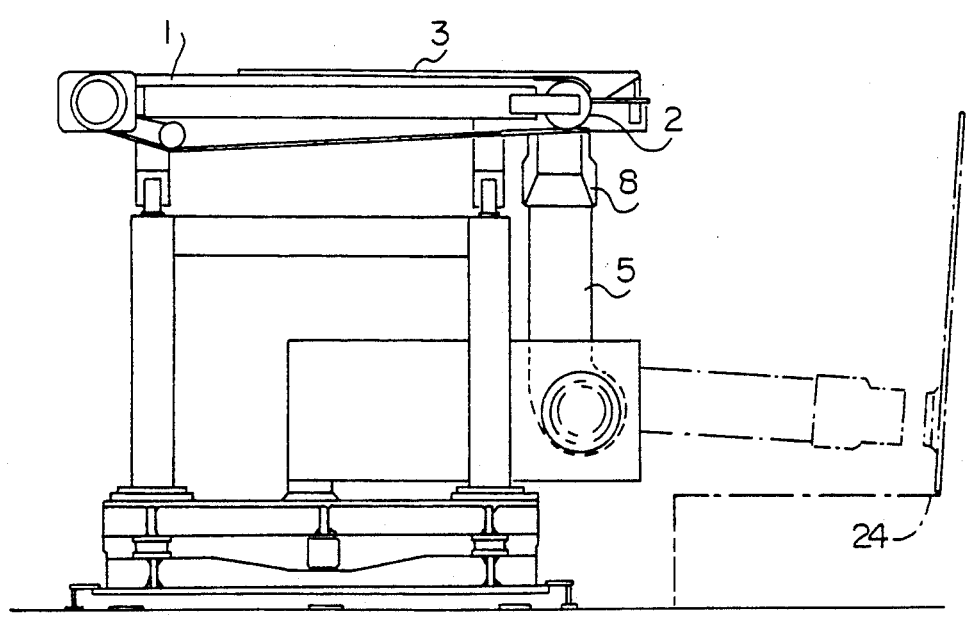
FIGS. 2A and 2B are lateral views of the installation of FIG. 1 (perpendicular to the axis of the conveyor).
Figure 2B:
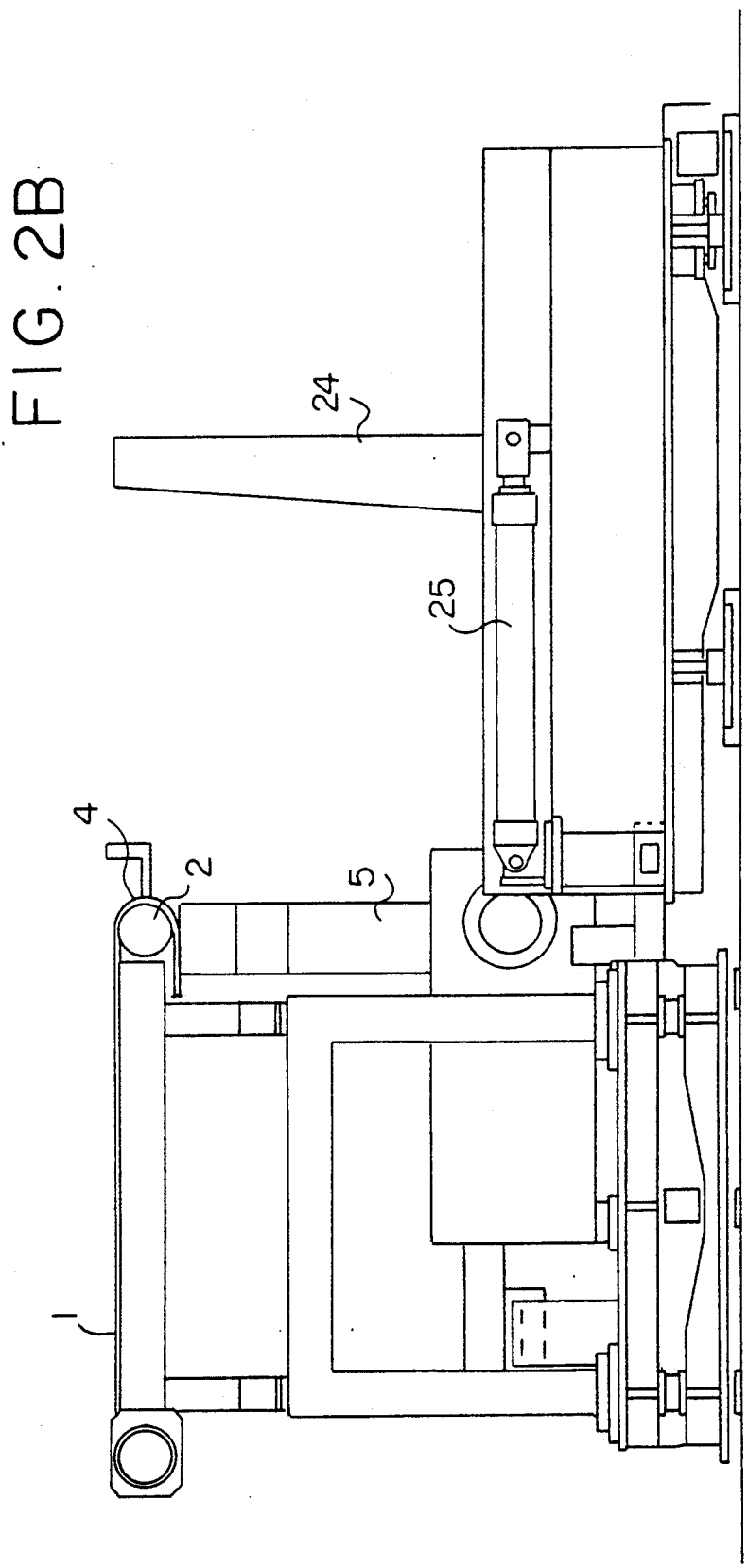

In FIGS. 1, 2A and 2B, the secondary conveyor is referenced (1), it is provided with rollers (2) on which abuts the sheet (3). The sheet thus arrives at the end of the secondary conveyor (1), it stops in front of the elevator at a so-called gripping station.

According to a preferred mode of operation, the secondary conveyor has a speed less than that of the principal conveyor, it stops when the sheet is at the gripping station.

A sheet passes from the principal conveyor to the secondary conveyor when the previous sheet has been gripped. The number of the spikes is then determined by the man skilled in the art as a function of the rates of lifting, the conveyor speeds and the lengths of the sheets.

At the gripping station, the consecutive sheets of the same dimensions to be lifted are in the same position.

- they are in abutment against stops (4) disposed at the end of the secondary conveyor;
- in the same campaign of production, the sheets to be lifted have the same dimensions and it is observed that their lateral edges are virtually aligned for a certain time (the veering, i.e. the offset, being of the order of 10 mm over 3 hours).

During the time of formation of a stack, one therefore has sheets always having the same position at the level of their lower edge (the one which will come into abutment on the virtually horizontal surface of the panel) and of their lateral edges.

The lifting installation according to the invention also comprises an elevator placed below and at the end of the secondary conveyor.

It comprises at least one arm (5) comprising a support (8) on which suction cups (7) are fixed.

According to the embodiment of FIG. 1, it has only one arm (5) terminating in two fingers (6) each bearing a suction cup (7), the fingers being borne by support (8).

If the width of the secondary conveyor is large, a plurality of arms, for example two, mounted side by side, may be provided.

The number of arms, of suction cups and the width of the support are determined by the man skilled in the art as a function of the dimensions of the sheets to be lifted.

The fingers (6) have a sufficient length to allow passage of the suction cups between the rollers (2).

For the sheets to be in equilibrium during lifting, it is necessary:

- that they be placed so that the suction cups are disposed symmetrically on either side of the longitudinal axis of symmetry of the sheets to be lifted,
- and that the elevator or the stops (4) be longitudinally displaced for the centers of the suction cups to be close to the median axis of the sheet (axis perpendicular to the longitudinal axis and passing through the center of the sheet).

In order to verify the first condition, before each campaign (corresponding to identical dimensions of sheets), the elevator and/or the secondary conveyor are laterally displaced.

When the distance between the rollers of the secondary conveyor allows just the passage of the fingers (6) (advantageous arrangement), the secondary conveyor and the elevator must be displaced simultaneously. For example (FIG. 1), a jack (9) may be used, acting on a frame 10 which is laterally mobile (in rails for example), said frame supporting the secondary conveyor and the elevator, and said frame also being provided with means for immobilization thereof.

It will be noted that the distance between the fingers (6) depends not only on the distance between two consecutive rollers of the conveyor but also depends on the width (direction perpendicular to the axis of the conveyor) of the sheets and that this distance cannot be increased inconsiderately. Likewise it cannot be admitted that the sheet of glass projects laterally to a considerable extent beyond the suction cup.

Such elevators operate well for glass sheets called "of small dimensions" in the glass-making industry, i.e. up to of the order of 1.5 m in width and 1 m in length and the sheets at the gripping station being located at more than 25 mm from the lateral edge of the conveyor.

The embodiment of FIG. 1 (one single arm with two fingers and two suction cups) is particularly well adapted to this application.

The distance between the fingers (6) and the rollers (2) of the secondary conveyor is a function of the glass sheets carried by the secondary conveyor.

The suction cups are of known type, they are connected to a system of vacuum-production from which suction is obtained in the suction cup and the sheet of glass is gripped. In order to release the sheet, it suffices to release the vacuum, atmospheric pressure being resumed.

Each suction cup is mounted on a spring which enables it to adapt itself to plates of different thickness.

Figure 3:
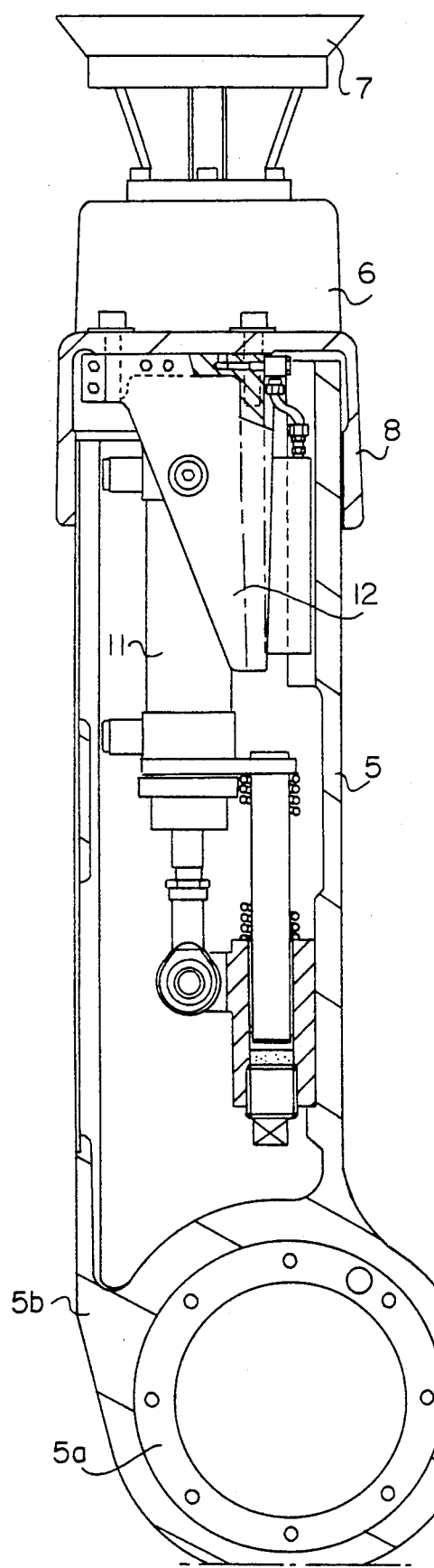
FIG. 3 presents in lateral section the arm of FIG. 1 with the support and the suction cups.

In order to avoid the stops (4) during lifting of the sheet, two solutions are available, taken separately or in combination, consisting of:

First solution: means for sliding the support (8) along the arm (5) (FIG. 3);

Second solution: means for displacing the arm (5) along its longitudinal axis.

In the first solution, this displacement is obtained for example by means of an automatically controlled jack (11) with small stroke, mounted in the arm (5) to act on the support (8). In the embodiment of FIG. 3, the rod of the jack (11) is connected to a tongue (12) fixed to the support (8). Said support surrounds the upper end of the arm (5) over a certain distance, with the result that, even in lifted position (jack rod extended), the support (8) still covers the arm (5), this in order to avoid dust (particularly of glass) entering the arm.

All the actuation means are generally inside the arm in order to be protected, only the energy supply means are or have an outlet outside (pipes for fluids for example).

In the second solution, this displacement is obtained for example by means of a jack with an eccentric acting on the end of the arm not bearing suction cups.

In these two solutions, the arm (5) and/or the support (8) is lifted for gripping the sheet, and it is then returned to its initial position during rotation of the arm, before or after deposit depending on the position of the deposit station.

For reasons of operating rates, dimensions of the sheet being lifted, and of ease of deposit, it is preferred to return to the initial position during rotation of the arm before deposit, then again to displace the support or the arm for deposit, and, finally, to return it to the initial position during rotation after deposit in order to be able to take a fresh sheet already in position at the gripping station.

The other end of the arm (5) is driven in rotation between the position corresponding to the arm, to the gripping station and the one corresponding to the arm in position at the deposit station (FIG. 2A).

The planes of the conveyor and of the panel being substantially horizontal, the angle of rotation is slightly greater than 90° (generally between 90° and 95°).

Figure 4:
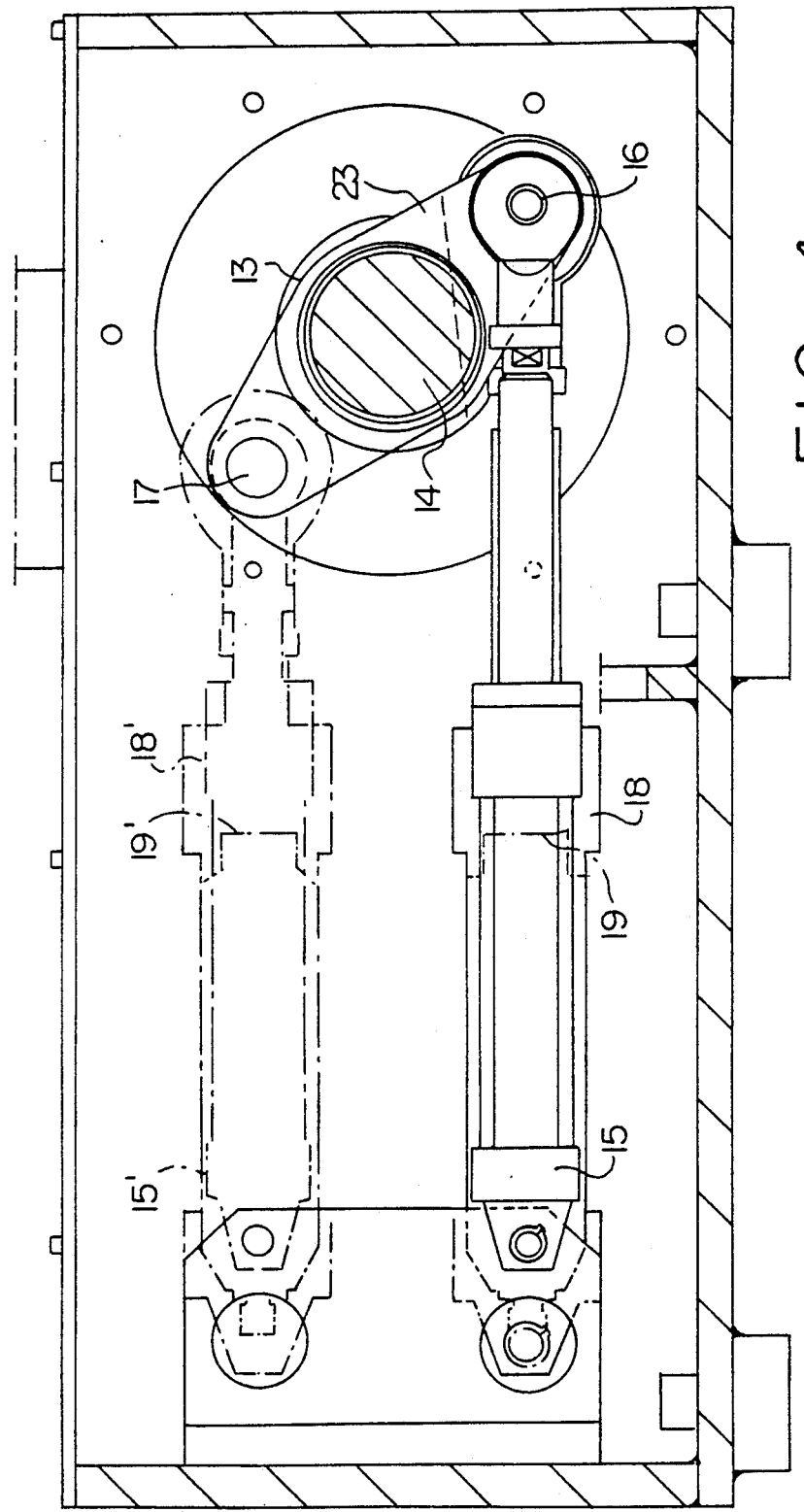
FIGS. 4 and 5 show detailed views, partially sectionalized, of the connecting rod-crank system (FIG. 1) for driving the arm.
Figure 5:
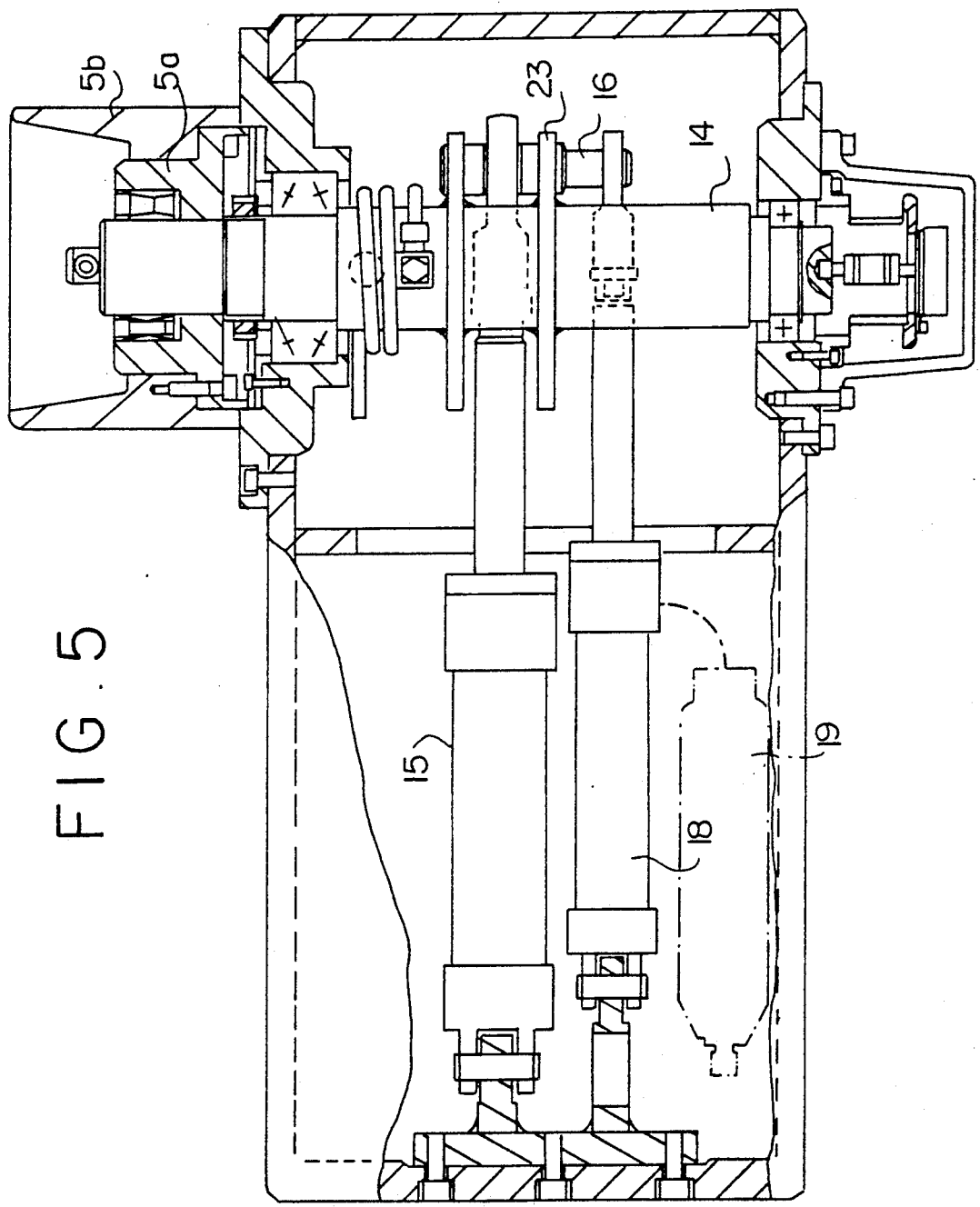

According to the invention, rotation is obtained by means of a connecting rod-crank system (13) (FIG. 4) mounted on a drive shaft (14) fixed to the arm (5) for example by connection to parts (5a) and (5b) shown in FIGS. 3 and 5.

A motive jack (15) (preferably hydraulic) secured to the crank pin (16) of the connecting rod (23) (FIG. 4) acts on the drive shaft (14) which itself drives arm (5) in rotation. A second motive jack (15') may also be provided, and may be secured to the crank pin (17) of the sub-connecting rod (23), one jack being active for the descent of the sheet (rotation of the arm in one direction) and the other for lifting the arm (return). This possibility is not shown in the Figures.

According to the invention, at least one hydraulic balancing jack (18) is mounted on the connecting rod-crank system (13).

Figure 6:
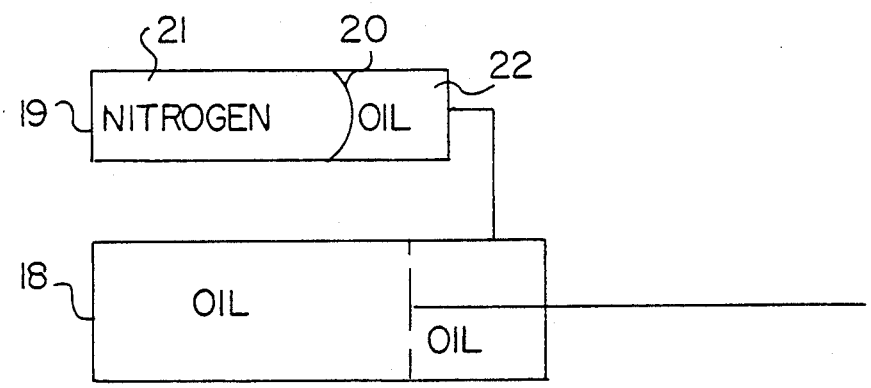

This jack (18) comprises a bored piston which then allows passage of the oil from one compartment of a jack to the other depending on the movement of the rod of the piston (FIG. 6).

Jack (18) is also connected to a nitrogen accumulator (19) constituted by a recipient provided with a mobile wall (20) separating it into two chambers, one (21) is closed and contains the nitrogen, the other (22) is connected to the jack (18).

The balancing jack (18) is necessarily mounted on the same crank pin as the motive jack (15) so that the energy accumulated during the descent of the arm to bring the sheet to the deposit station is used during the rise of said arm, this accumulated energy increases as the arm (5) carrying a sheet is lowered. This embodiment is shown in FIG. 4, the jack (18) being in solid lines.

A second balancing jack (18') may be added, it is in that case connected to the crank pin (17) of the connecting rod (23). In FIG. 4, this arrangement corresponds to the jack (18') in broken lines.

The displacement of the rods of the motive jacks (15, 15') respectively provoke slide of the rods of the balancing jacks (18, 18').

The piston of this jack being bored, the oil communicates from one chamber to the other in the jack (18) and communicates with the chamber (22) of the accumulator.

If reference is made to the solid-line diagram of FIG. 4, when the arm rotates to bring the sheet from the gripping station to the deposit station, the rod of the jack (15) retracts, the oil of the jack (18) driven by the retraction of the rod of this jack will escape into chamber (22) of the accumulator. Upon return of the arm, this stored energy is utilized: the oil departs again into the jack (18) provoking the retraction of its piston which then actuates the connecting rod (23), rotation of the arm (5) is obtained for pressures of the motive and balancing jacks suitably chosen by the man skilled in the art.

This advantageous device allows dampening of the movements (role of equalizer) and also makes it possible to decrease the power required for operation (role of energy recuperator).

Tests made on the machine have shown that it is particularly advantageous to have, for the rotation of the arms, the following motion equation:

$$\alpha = A\left(\frac{t}{to}\right)^5 + B\left(\frac{t}{to}\right)^4 + C\left(\frac{t}{to}\right)^3$$

with $\alpha$ = angle of rotation of the arm, A,B,C = constants determined experimentally, so as to optimize the accelerations and decelerations of the arm in order to guarantee the rates and absence of shocks.

The motive jack is then automatically controlled in order to generate this law on the arm.

The deposit station is constituted by a panel (24) presenting a substantially horizontal plane and a substantially vertical plane for supporting the sheets. The panel is positioned when it arrives empty so as to be in the longitudinal axis of the sheets and in that of the arm.

Its horizontal plane is located at a height slightly lower than that of the lower edge of the arriving sheet, the sheet released by the suction cups dropping for deposit on said plane.

The admissible height of drop is given by the glass-maker as a function of the material and of the thickness of the sheet.

In order to improve stacking of the sheets, air may be blown through the suction cups to apply the glass against the existing stack.

After each deposit, the panel is displaced step by step in the direction of the axis of the conveyor for example by a jack (25), by a value predetermined as a function of the thickness of the sheets.

The installation also comprises means for automatic control thereof from information furnished in particular by sensors disposed on the installation, processed by a computer provided with software. The conveying speeds, the halting of the sheets at the gripping station, the rotation of the arm, the step-by-step displacement of the panel, its evacuation and its positioning, the lateral displacements of the elevator and of the secondary conveyor are in particular regulated automatically.

Such an installation has allowed very rapid lifting (of the order of 2 secs. and even less than 2 secs.) of glass sheets of:
  width: 600 mm to 1200 mm
  length: 400 mm to 800 mm
  thickness: 2 mm to 8 mm with stacks of maximum thickness of 475 mm, the speed of introduction on the secondary conveyor being 60 m/min., this for an installed power for the rotation of the arm of the order of 5 kw.

The invention has been described for the stacking of sheets of glass, it may be used for unstacking sheets of glass without bringing any mechanical modifications to the installation, only modifications of the control software are necessary.

In that case, it is obvious for the man skilled in the art that:

the gripping station is constituted by panel (24) described hereinabove, the deposit station is constituted by the principal conveyor which may then advance without stopping.

I claim:

1. An installation for rapidly lifting and stacking sheets of glass advancing on a horizontal principal conveyor, comprising:
   a secondary conveyor (1) placed in line with said principal conveyor and on which the sheets (3) are gripped at a gripping station, said secondary conveyor including a plurality of spaced rollers (2),
   at the downstream end of and below said secondary conveyor, an elevator comprising:
     at least one arm (5) including a support (8) on which are fixed suction cups (7) connected to a vacuum-producing means and disposed so as to pass between the rollers (2) of the secondary conveyor to grip the sheet,
     a connecting rod-crank system (13) actuated by at least one motive jack (15) acting on said arm(s) in order to obtain rotation thereof through an angle of about 90° about a horizontal axis perpendicular to the longitudinal axis of the secondary conveyor so as to bring the sheets to a depositing station,
   panel means (24) constituting the depositing station and being displaceable along the axis of the secondary conveyor,
   means for automatically controlling, in particular the speeds of conveying, the halting of the sheets, the movements of the arm(s) and of the panel means, characterized in that it further comprises:
   at least one hydraulic balancing jack (18) connected to said connecting rod-crank system (13) and also connected to a nitrogen accumulator (19) so as to dampen the movements of the arm(s) and to reduce the power required to move the arm(s),
   means for displacing at least one of the arm(s) (5) and the support (8) bearing the section cups (7) along the longitudinal axis of said arm(s), for gripping and depositing the sheets, and
   means for laterally displacing at least one of the secondary conveyor and the elevator for alignment with sheets delivered thereto.

2. An installation for rapidly lifting and stacking sheets of glass comprising:
   a conveyor including a plurality of spaced rollers,
   at one end of and below said conveyor, an elevator comprising:
     at least one arm (5) comprising a support (8) on which are fixed suction cups (7) connected to a vacuum-producing means and disposed so as to pass between the rollers (2) of the conveyor to deposit the sheet,
     a connecting rod-crank system (13) actuated by at least one motive jack (15) acting on said arm(s) in order to obtain rotation thereof through an angle of about 90° about a horizontal axis perpendicular to the axis of the conveyor so as to bring the sheets to the conveyor from a deposit station,
   panel means (24) constituting the deposit station and being displaceable along the axis of the conveyor,
   means for automatically controlling, in particular the speeds of conveying of the sheets, the movements of the arm(s) and of the panel means, characterized in that it further comprises:
   at least one hydraulic balancing jack (18) connected to said connecting rod-crank system (13) and also connected to a nitrogen accumulator (19) so as to dampen the movements of the arm(s) during lowering and to reduce the power required to move the arm(s),
   means for displacing the arm(s) (5) and/or the support (8) bearing the suction cups (7) along the longitudinal axis of said arm(s), for gripping, releasing and depositing the sheets upon the conveyor, and
   means for laterally displacing the conveyor and the elevator.

3. An installation according to one of claims 1 or 2, characterized in that the displacement of the motive jack is controlled so that the rotation of the arm(s) obeys the law:

$$\alpha = A\left(\frac{t}{t_0}\right)^5 + B\left(\frac{t}{t_0}\right)^4 + C\left(\frac{t}{t_0}\right)^3$$

with
$\alpha$ = angle of rotation of the arms
A,B,C = constants

4. An installation according to claim 1 characterized in that the support (8) slides on the arm (5) over a distance at least sufficient to avoid, during lifting, the stops (4) on which the sheet is in abutment at the gripping station.

* * * * *

UNITED STATES PATENT AND TRADEMARK OFFICE
CERTIFICATE OF CORRECTION

PATENT NO. : 5,030,059

DATED : July 9, 1991

INVENTOR(S) : Favre

It is certified that error appears in the above-identified patent and that said Letters Patent is hereby corrected as shown below:

Column 7, line 53, "section" should be --suction--

Signed and Sealed this

Eighth Day of December, 1992

Attest:

DOUGLAS B. COMER

*Attesting Officer*  *Acting Commissioner of Patents and Trademarks*